US010436617B2

(12) United States Patent
Ottersten et al.

(10) Patent No.: US 10,436,617 B2
(45) Date of Patent: Oct. 8, 2019

(54) METHOD FOR ADJUSTING A SENSOR

(71) Applicant: Endress+Hauser Conducta GmbH+Co. KG, Gerlingen (DE)

(72) Inventors: Bo Ottersten, Regensburg (DE); Martin Freudenberger, Schwaikheim (DE); Martin Lohmann, Gerlingen (DE)

(73) Assignee: Endress+Hauser Conducta GmbH+Co. KG, Gerligen (DE)

( * ) Notice: Subject to any disclaimer, the term of this patent is extended or adjusted under 35 U.S.C. 154(b) by 296 days.

(21) Appl. No.: 15/154,402

(22) Filed: May 13, 2016

(65) Prior Publication Data
US 2016/0334247 A1 Nov. 17, 2016

(30) Foreign Application Priority Data

May 13, 2015 (DE) .................. 10 2015 107 563

(51) Int. Cl.
*G01C 19/00* (2013.01)
*G01D 18/00* (2006.01)
(52) U.S. Cl.
CPC .................. *G01D 18/008* (2013.01)
(58) Field of Classification Search
CPC ................................... G01D 18/008
USPC ........................................ 702/104
See application file for complete search history.

(56) References Cited

U.S. PATENT DOCUMENTS

| 5,153,837 A * | 10/1992 | Shaffer | G06Q 30/04 324/103 R |
| 5,419,301 A * | 5/1995 | Schechter | F01L 9/02 123/673 |
| 5,659,302 A * | 8/1997 | Cordier | G01P 1/127 340/665 |
| 5,808,273 A * | 9/1998 | Galster | G01R 33/09 219/121.69 |
| 6,026,673 A * | 2/2000 | Santini | G01N 33/0063 702/100 |
| 6,188,537 B1 * | 2/2001 | Eland | G01D 18/00 360/75 |
| 6,246,968 B1 * | 6/2001 | Wilczek | G01D 3/022 702/104 |
| 8,880,371 B2 * | 11/2014 | Beyer | A61B 5/0031 600/309 |
| 2004/0249592 A1 | 12/2004 | Koukol, Jr. et al. | |

(Continued)

FOREIGN PATENT DOCUMENTS

DE 102006020341 A1 10/2007

*Primary Examiner* — Caleb E Henry
(74) *Attorney, Agent, or Firm* — Mark A. Logan; PatServe

(57) ABSTRACT

At least one aspect of the disclosure includes a method for start-up of a sensor comprising the steps of performing a factory adjustment during the manufacture of the sensor to generate factory adjustment data; permanently storing of the factory adjustment data from the factory adjustment in a memory of the sensor; prior to first use of the sensor, performing an initial user adjustment to generate initial user adjustment data; and permanently storing of the initial user adjustment data from the initial user adjustment in the memory. Another aspect of the disclosure improves the status evaluation of the sensor by enable permanent access to both the factory adjustment data and the initial user adjustment.

8 Claims, 1 Drawing Sheet

(56) References Cited

U.S. PATENT DOCUMENTS

| | | | |
|---|---|---|---|
| 2007/0071395 A1* | 3/2007 | Boone | G11B 20/10 386/224 |
| 2007/0110620 A1* | 5/2007 | Pechstein | G01N 27/286 422/82.01 |
| 2011/0144938 A1 | 6/2011 | McAnally et al. | |
| 2014/0275886 A1* | 9/2014 | Teixeira | A61B 5/0205 600/324 |

* cited by examiner

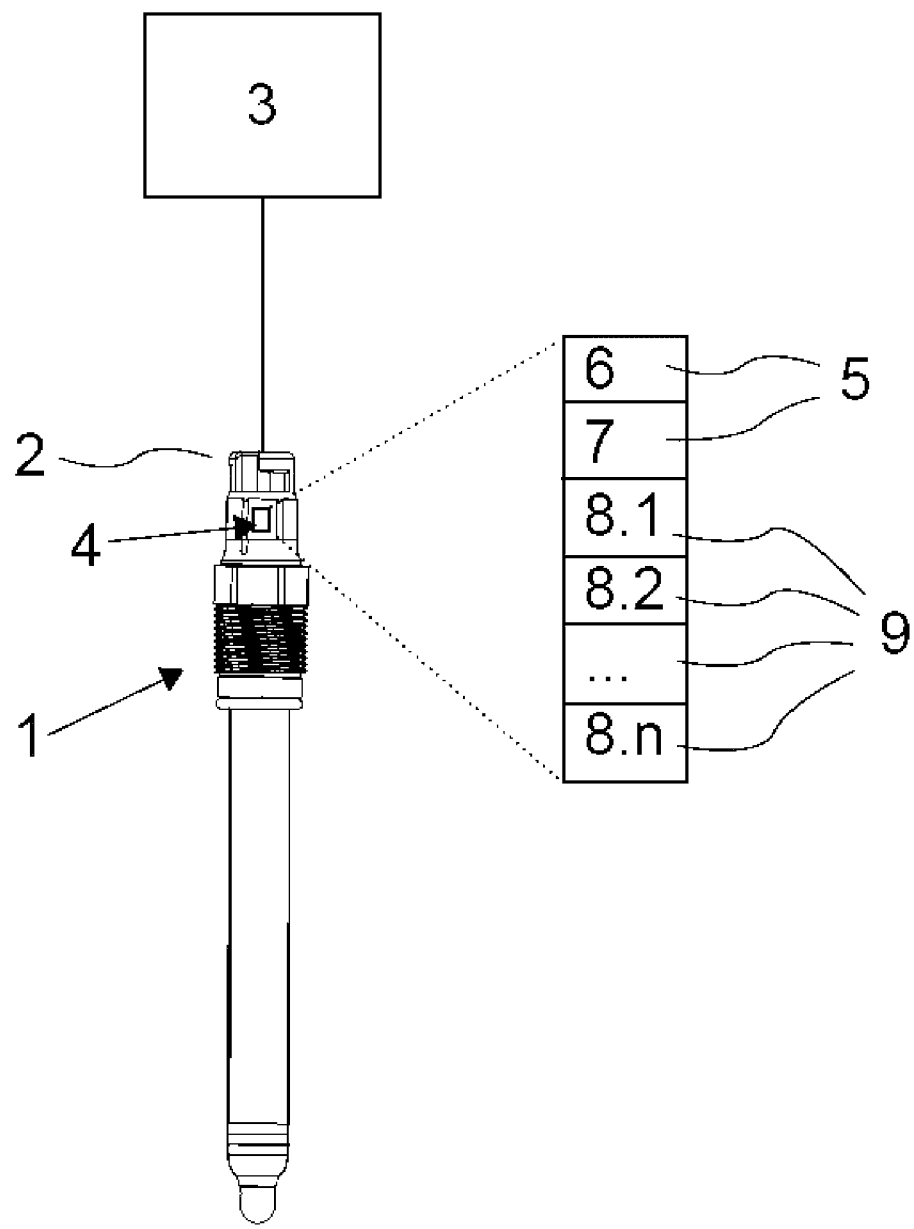

METHOD FOR ADJUSTING A SENSOR

CROSS-REFERENCE TO RELATED APPLICATIONS

The present application claims priority to German Patent Application No. 102015107563.6, filed on May 13, 2015, the entire content of which is incorporated herein by reference.

TECHNICAL FIELD

The disclosure relates to a method for the start-up of a sensor, in particular, with respect to the field of process automation.

BACKGROUND

A digital sensor refers to a sensor with a microcontroller, a memory, and a certain intelligence. The sensor portion of the digital sensor may be an electrochemical sensor such as: a pH electrode; an ion selective electrode; or an oxygen sensor—in particular, a dissolved oxygen sensor. The sensor may be a conductivity sensor. The sensor may also be an optical sensor—especially, a turbidity sensor, or a sensor for optically determining the number of cells or cell structures.

Over time, sensors increasingly deviate from ideal behavior as a result of aging due to the influence of external conditions that burden the sensor, as well as from internal changes. This deviation from ideal behavior results in a shifting of the measurement chain characteristic curve. It is therefore common practice to carry out a correction from time to time to compensate for the deviation. This is quite common in electrochemical sensors such as pH electrodes, ion selective electrodes, oxygen sensors—in particular, dissolved oxygen sensors—and even in conductivity sensors. Such a correction, in which the display value of the sensor is aligned with the true value of the measurement, is called adjustment.

Digital sensors for process automation are usually calibrated and adjusted during production. In the following, this calibration and adjustment during production will be referred to as a "factory adjustment." The adjustment data for this factory adjustment are stored permanently in a memory in the digital sensor and cannot be overwritten by subsequent calibrations and adjustments.

The users themselves perform calibrations and adjustments. In the following, this adjustment by the user shall be referred to as "user adjustment." The adjustment data for this user adjustment are also stored in a memory in the digital sensor. This storage location is limited, and only a certain amount of adjustment data can be stored. This amount varies depending upon the type and manufacturer of the sensor. Commonly two to ten sets of adjustment data can be stored. Typically a FIFO storage sequence (First In, First Out) is used. When the memory is full, newer adjustment data can overwrite the older adjustment data.

The memory with the history of the adjustment data is available for the status evaluation of the sensor. Thus, a drift or atypical sensor behavior can be determined by comparing multiple stored adjustment data, and a statement can be made on the sensor status. Usually a status evaluation of the adjustment data in the memory relates to comparing the data from the last available adjustments to the data from the factory adjustment. Changes in the sensor since the beginning of its implementation (i.e., its first use by the user) can thus not be fully considered. This has a negative influence on the status evaluation of the sensor. Therefore, there is a need for improvements in this area of technology.

BRIEF SUMMARY

At least one aspect of the disclosure enables an improved status evaluation of a sensor. The improvement is achieved by a method for the start-up of the sensor, the method including at least the following steps: performing a first adjustment during the sensor manufacturing during which the factory adjustment data are permanently stored in a memory in the digital sensor; delivering the digital sensor to the customer; and performing an initial user adjustment in which the initial user adjustment data are permanently stored in a memory of the digital sensor.

BRIEF DESCRIPTION OF THE DRAWINGS

FIG. 1 shows a front view of a sensor, including a symbolic representation of sensor memory, according to an embodiment of the present disclosure.

DETAILED DESCRIPTION

Often, some time passes between the factory adjustment and the initial user adjustment. "Initial user adjustment" refers here to the first adjustment after transport and storage. This is often done immediately before the first use of the sensor. The storage of the sensor often does not take place under constant temperature and humidity conditions. Thus, the initial user adjustment is not the same as the factory adjustment. Moreover, the user usually applies different standards for the adjustment. Besides, each user has his own method (for example, with respect to the duration of the calibration/adjustment of the rinsing, drying, etc.), which differs from the method of the factory adjustment.

The data from the initial user adjustment are required to detect a change in the sensor during its process implementation, because this was done at the beginning of its process implementation, i.e., after transport and storage. Moreover, this adjustment is performed by the user under ambient conditions and with the reference solutions of the user.

According to prior art, later adjustments by the user overwrite the data of the initial user adjustment. Therefore, this disclosure proposes that the adjustment data from the initial user adjustment be permanently stored in the sensor memory. One the initial user adjustment is complete, these data cannot be deleted or overwritten by the user.

An interaction is necessary for confirmation during the initial adjustment by the user, so that the current adjustment value is permanently saved as the initial user adjustment. In the event that the adjustment has been performed incorrectly, the user has the option of repeating it.

In an advantageous further development, additional adjustment data can be stored in addition to the permanently stored factory adjustment data and initial user adjustment data. These additional adjustment data are stored in a FIFO memory, where newer adjustment data can overwrite older adjustment data.

A status evaluation of the sensor is performed based upon the adjustment data from the factory adjustment. For a more exact status evaluation, the status evaluation of the sensor is performed based upon the initial user adjustment data as well as the factory adjustment data.

The task is further facilitated by a computer program product that is customized in such a way that it performs the steps of storing the adjustment data and performs the status evaluation of the sensor. The computer program product is configured such that it permanently stores the adjustment data from the factory adjustment and initial user adjustment on a computer-readable data medium—in particular, on a memory—and these cannot be overwritten by the user, even at a later time. Further, the computer program product can also store a limited amount of subsequent adjustment data on the computer-readable data medium.

The task is further facilitated by a machine-readable data carrier comprising the computer program product, as described above. The machine-readable data carrier has, for example, a memory.

The task is further facilitated by a digital sensor, comprising a machine-readable data carrier, as described above. The digital sensor includes, for example, one pH-sensor.

In an advantageous embodiment, the digital sensor comprises an inductive interface for transferring, at a minimum, the adjustment data from the factory adjustment and/or the initial user adjustment to a superordinate unit. The superordinate unit comprises, for example, a transmitter or a computer, on which appropriate software is running, connected to the sensor.

This disclosure relates, in particular, to the field of process automation and may, without limiting the generality, be illustrated by digital sensor 1. Digital sensor 1 may include a pH sensor; alternatively, digital sensor 1 may include a sensor for redox potential or ISFET, temperature, conductivity, pressure, oxygen—especially, dissolved oxygen—or carbon dioxide; an ion-selective sensor; an optical sensor—especially, a turbidity sensor—a sensor for optical determination of oxygen concentration or a sensor to determine the number of cells and cell structures; a sensor to monitor certain organic or metallic compounds; a sensor to determine the concentration of a chemical substance—for example, a certain element or a certain compound; or a biosensor—for example, a glucose sensor.

The digital sensor 1 includes an inductive interface 2 for transferring, at a minimum, the adjustment data from the factory adjustment 6 and/or the initial user adjustment 7 to a superordinate unit 3. The superordinate unit 3 includes, for example, a transducer or a dispatcher. Alternatively, the superordinate unit 3 includes a digital sensor 1 connected to the computer on which software for reading, calibration and adjustment, etc., of the digital sensor 1 is running. Also, as described further herein, a status evaluation can be performed by means of the superordinate unit 3—in particular, by means of a transducer or a connected computer.

The digital sensor 1 is factory calibrated and factory adjusted immediately after production. The adjustment data from the factory adjustment 6 are permanently stored in a memory 5. The memory 5 is part of a data carrier 4, which in turn may be part of an intelligent unit—for example, a microcontroller. The permanent memory 5 is an integral part of digital sensor 1.

Upon delivery of the digital sensor 1, it is first calibrated by the user immediately or after some time, but before use by the user. The data from this initial user adjustment 7 are also permanently stored in memory 5. This data cannot be deleted or overwritten by the user. During the first adjustment by the user, an interaction is required to confirm that the current adjustment should be saved permanently as the initial user adjustment 7. In the event that the adjustment has been performed incorrectly, the user has the option of repeating it.

Any further adjustment data 8.1, 8.2, 8.n by the user are stored in another memory 9. The adjustment data from further adjustments 8.1, 8.2, 8.n are not permanently stored. The memory 9 is configured as a FIFO memory, i.e., the oldest adjustment is deleted first. Also, the memory 9 is part of a data carrier 4, which in turn may be part of an intelligent unit—for example, a microcontroller. The memory 9 is an integral part of the sensor 1. Memory 9 and permanent memory 5 can be configured as at least two separate memories. Alternatively, a single memory may be used and by means of software, one memory area is configured as "permanent," another as a "FIFO."

A status evaluation of the digital sensor 1 is possible, regardless of the place where the digital sensor 1 is used, e.g., in the laboratory. Only through the permanent storage of the initial user adjustment 7 in the digital sensor 1 does the user have the advantage of better status evaluation, regardless of where the adjustment or the status evaluation is performed, whether in the laboratory or in-line.

A status evaluation should be regarded as a comparison of a current sensor status with the previous one. Either the factory adjustment 6 and/or the initial user adjustment 7 is considered here to be an earlier status.

In the case of a pH sensor, the status may include at least one of the characteristics zero point, steepness, speed, sensitivity, reaction rate, glass properties, or others. The current status of a sensor is considered for determining a measurement quality or probability of failure, or for predicting remaining operational life, i.e., time remaining for required maintenance work or for the required replacement of the sensor.

In at least one embodiment of the present disclosure, the disclosure includes a method for start-up of a sensor, comprising at least the steps of performing a factory adjustment during the sensor production, permanent storage of adjustment data from the factory calibration in a memory of the sensor, delivering the sensor to the customer, and performing an initial user adjustment, characterized in that adjustment data from the initial user adjustment are stored permanently in the memory of the sensor. The method further includes an interaction by a user that is necessary to confirm the initial user adjustment, so that the current adjustment value is saved permanently as the initial user adjustment. In an embodiment, in addition to the permanently stored initial adjustment data from the initial user adjustment, additional adjustment data can be stored, which are subsequently overwritten by later adjustment data. The method includes that a status evaluation of the sensor is performed based upon the adjustment data from the factory adjustment. In another embodiment, a status evaluation of the sensor is performed based upon the adjustment data from the initial user adjustment.

In at least one embodiment of the present disclosure, the disclosure includes a computer program product which is adapted such that it performs the steps of storing and/or the status evaluation according to the method. The computer program product is adapted such that, in addition to the permanently stored initial adjustment data from the initial user adjustment, additional adjustment data can be stored, which are subsequently overwritten by later adjustment data. In at least one embodiment, the computer program product is included in a machine-readable data carrier. In at least one embodiment, the machine-readable data carrier is included in a sensor. In such in embodiment, the sensor includes an inductive interface for transferring, at a minimum, the adjustment data from the factory adjustment and/or the initial user adjustment to a superordinate unit.

While various embodiments of a sensor and methods for adjusting, calibrating, using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A method for adjusting a sensor, comprising:
providing a sensor including a non-volatile memory;
performing a first calibration and adjustment of the sensor to yield first adjustment data, wherein the first calibration and adjustment is a factory calibration and adjustment;
storing the first adjustment data permanently in the non-volatile memory of the sensor;
delivering the sensor to a user;
performing a second calibration and adjustment of the sensor to yield second adjustment data prior to use of the sensor, wherein the second calibration and adjustment is performed by the user before a first use of the sensor;
storing the second adjustment data permanently in the non-volatile memory of the sensor;
performing an additional calibration and adjustment of the sensor to yield additional adjustment data;
storing the additional adjustment data in the non-volatile memory, wherein the first adjustment data and the second adjustment data are not overwritten with the additional adjustment data; and
comparing the additional adjustment data with the first adjustment data or the second adjustment data to perform a status evaluation of the sensor.

2. The method of claim 1, the method further comprising:
confirming by user interaction the storage of the second adjustment data before the second adjustment data are permanently stored in the non-volatile memory.

3. The method of claim 1, further comprising:
performing a subsequent additional calibration and adjustment of the sensor to yield subsequent additional adjustment data;
storing the subsequent additional adjustment data in the non-volatile memory, wherein the additional adjustment data are overwritten with the subsequent additional adjustment data according to the first-in, first-out (FIFO) principle.

4. The method of claim 1, wherein the steps of permanently storing the first adjustment data and permanently storing the second adjustment data are performed by a computer program product.

5. The method of claim 1, wherein the storing of the first adjustment data, the storing of the second adjustment data, the storing of the additional adjustment data, and the performing of the status evaluation is performed by a computer program product.

6. The method of claim 5, wherein the computer program product is further adapted to store additional adjustment data and to overwrite previous additional adjustment data with subsequent additional adjustment data.

7. The method of claim 1, wherein the sensor is a digital sensor.

8. The method of claim 1, wherein the status evaluation is used for determining a measurement quality of the sensor or a probability of failure of the sensor or a prediction of the remaining operational life time of the sensor or a time span remaining for a required maintenance work of the sensor or a required replacement of the sensor.

* * * * *